April 17, 1951  K. O. SISSON  2,549,025
SEQUENTIAL REGULATING DEVICE
Filed Oct. 2, 1948  3 Sheets-Sheet 3

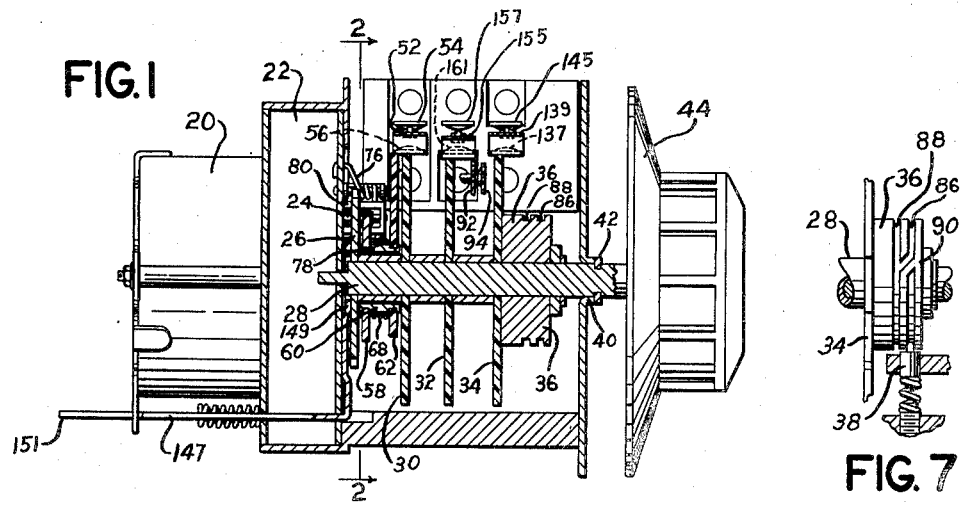
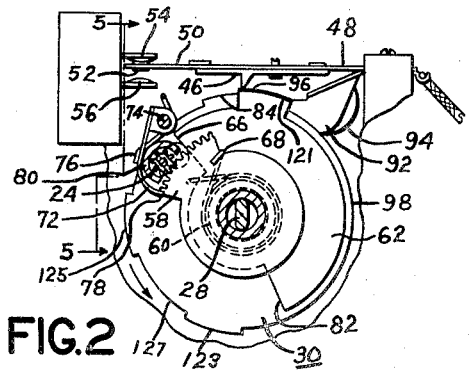
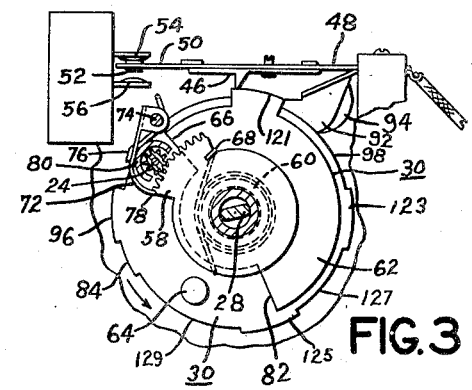
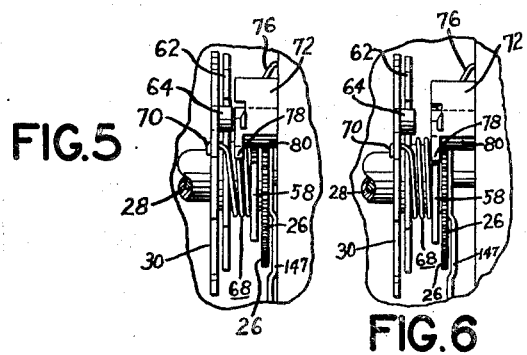
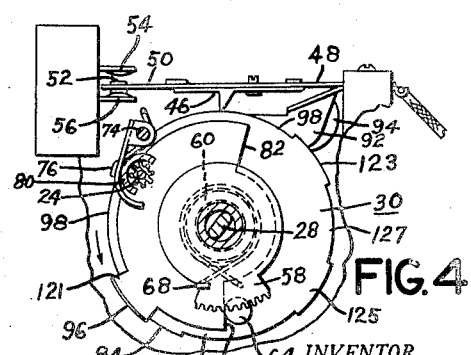

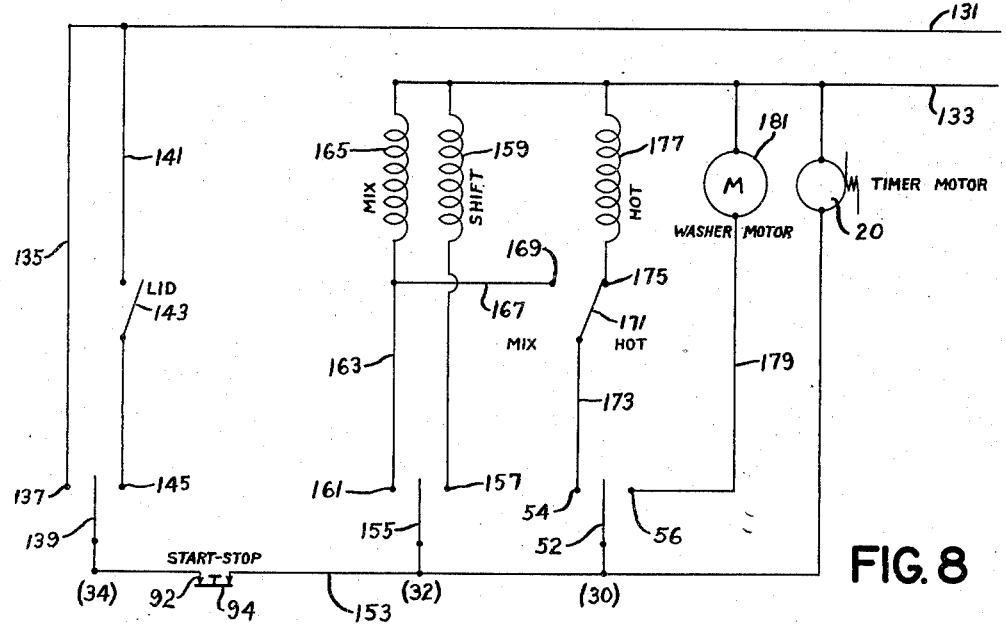
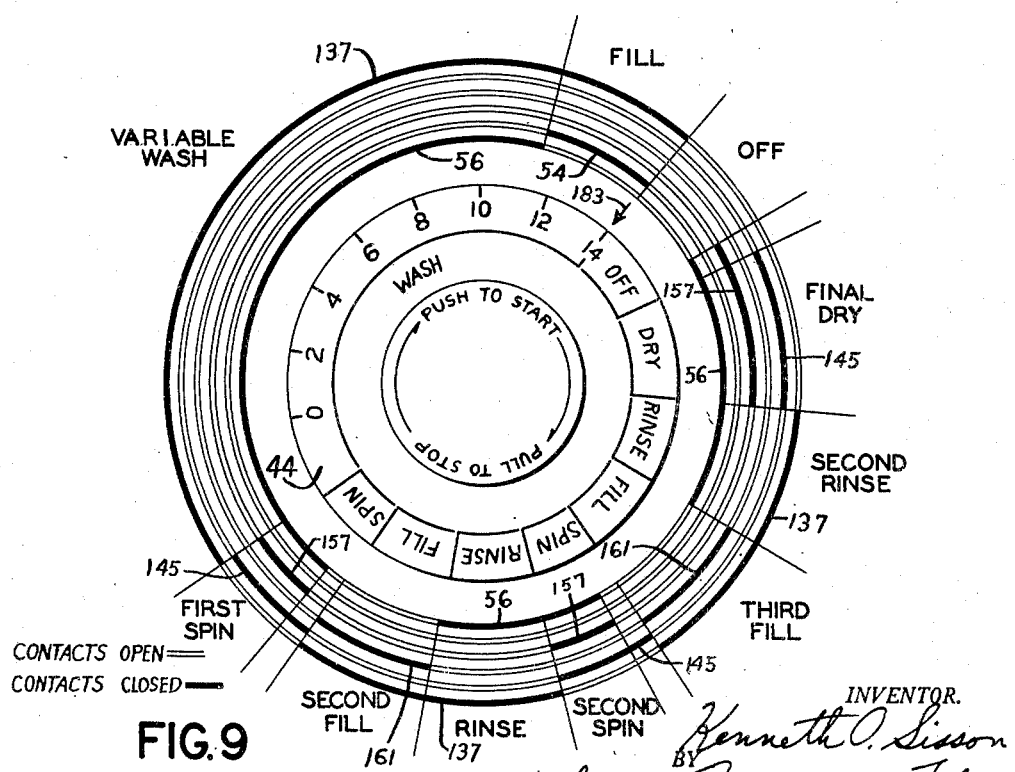

INVENTOR.
Kenneth O. Sisson
BY
Spencer Hardman and Fehr
Attorneys

Patented Apr. 17, 1951

2,549,025

UNITED STATES PATENT OFFICE 2,549,025

SEQUENTIAL REGULATING DEVICE

Kenneth O. Sisson, Oakwood, Ohio, assignor to General Motors Corporation, Dayton, Ohio, a corporation of Delaware Application October 2, 1948, Serial No. 52,564

13 Claims. (Cl. 74—640)

This invention relates to a domestic appliance and more particularly to automatic sequential regulating devices which are used to control a plurality of operations in a particular sequence.

In one use of the invention, for example, the control is used to control the various operations in an automatic washing machine. It is desirable that the washing period be made variable and it is further desirable that it be possible to select the desired period of washing at the time the machine is filled with dry soiled clothes. It is desirable to use the regulating device for regulating the filling period in which the clothes receptacle is filled with water. However, it has been found difficult to find a simple dependable convenient way in which the washing period in such a device might be selected before the fill period without interfering with or varying the length of the timed fill period of the regulating device.

It is therefore an object of my invention to provide an automatic sequential regulating device with a simple durable reliable positive means for preselecting the duration of an intermediate portion of the sequence without changing the duration of preceding and succeeding portions of the sequence.

It is another object of my invention to provide a regulating device having a single driving means for driving two different operative devices whose relationship is changed by disconnecting and reconnecting in a different relationship one of the operating devices from the driving means.

It is another object of my invention to provide a regulating device having a single drive means in continuous driving relationship with a first operated device and in a controllable limited discontinuous driving relationship with a second operated device, which driving relationship is selectively coordinated with the first operative device.

It is another object of my invention to provide a control in which one operative device is selectively arranged in a plurality of different relationships relative to a second operating device but which automatically returns to a predetermined relationship at the end of a predetermined sequence of operations.

To attain these objects I have provided a regulating device in which a cam shaft provided with a gear is driven in a predetermined timed relationship by a pinion. A coaxial relatively rotatable shaft is provided with a cam and a sector gear having teeth arranged on the same pitch diameter and having the same width and depth of teeth as the main cam shaft gear. This sector gear is arranged so that it may be moved axially into and out of engagement with the drive pinion. A torsion spring is provided which normally urges the sector gear and its cam to rotate in the normal direction of rotation against a stop upon the main gear cam unit. A fixed but yielding stop is also provided for the unit which includes the sector gear.

By this arrangement when the cam shaft is moved axially to disengage the sector gear from the pinion and then turned so that the sector gear unit engages the fixed but yielding stop and when further turned in the same direction, the sector gear and its cam will be retarded relative to the main gear and its cams so that when the cam shaft is returned by the reverse axial movement to its original position reengaging the sector gear with the drive pinion, there will be a different relationship between the sector gear cam unit and the main gear cam unit. This relationship will be retained as long as the drive pinion is in mesh with both the main gear and the sector gear. However, after the drive pinion drives the sector gear out of mesh with it, the sector gear cam unit will be free to return to its former position in engagement with the stop on the main gear cam unit under the influence of the torsion spring which advances it in the direction of normal rotation.

Further objects and advantages of the present invention will be apparent from the following description, reference being had to the accompanying drawings, wherein a preferred form of the present invention is clearly shown.

In the drawings:

Fig. 1 is a vertical sectional view through an automatic timing sequential regulating device embodying one form of my invention;

Fig. 2 is a sectional view taken along the line 2—2 of Fig. 1 with the parts shown in position for a full intermediate portion, such as a full 14 minute washing period in an automatic washer;

Fig. 3 is a sectional view similar to Fig. 2, but with the sector gear cam unit and the main cam unit arranged to provide an intermediate period of half the length compared to that shown in Fig. 2, such as a 7 minute washing period;

Fig. 4 is a view disclosing the relationship of the sector gear cam unit and the main cam unit after the termination of the intermediate period, such as the 7 minute washing period;

Fig. 5 is a fragmentary sectional view taken along the line 5—5 of Fig. 2 with the sector gear in mesh with the drive pinion;

Fig. 6 is a fragmentary sectional view also taken along the line 5—5 of Fig. 2 with the sector gear out of mesh with the drive pinion and held by a pivoted arm;

Fig. 7 is an elevational view illustrating the cam regulation of the axial movement of the main gear cam shaft;

Fig. 8 is a wiring diagram of an automatic washing machine and its regulating device;

Fig. 9 is a view illustrating the dial of the timer together with a diagrammatic representation of the open and closed periods of various switch contact mechanisms shown in Fig. 8;

Fig. 10 is a fragmentary view of a modified form of sector cam provided with a plurality of lobes;

Figure 11:
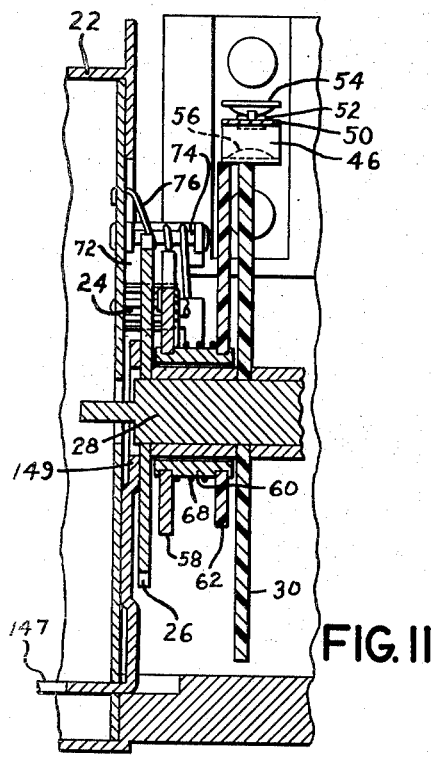
Figure 14:
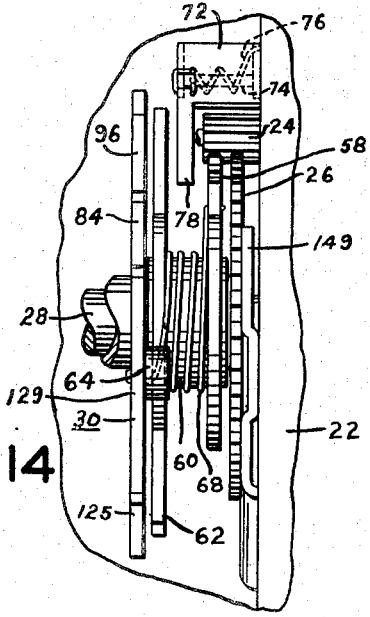
Figure 12:
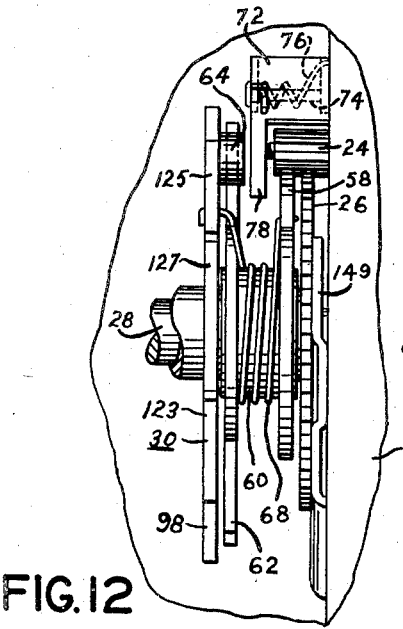
Figures 13, 15:
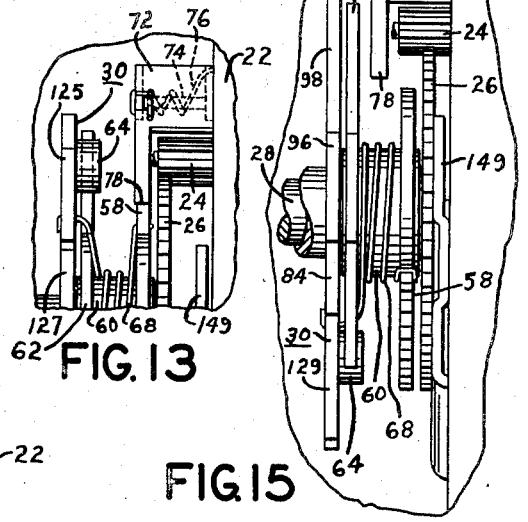

Fig. 11 is an enlarged view of the novel portion of Fig. 1 which includes the sector gear 58 and the sector cam 62. In this view the cover 80 has been omitted so that the remaining parts will be more clearly illustrated;

Fig. 12 is an enlarged view looking upwardly from the left at an angle of 45 degrees in Fig. 2. In this view also the cover 80 has been omitted;

Fig. 13 is a fragmentary view similar to Fig. 12 with the main cam shaft 28 pulled out;

Fig. 14 is an enlarged view looking upwardly at an angle of 45 degrees from the left of Fig. 3. In this view also the cover 80 has been omitted; and Fig. 15 is an enlarged view looking upwardly at an angle of 45 degrees from the left of Fig. 4.

Referring now to the drawings and more particularly to Fig. 1, the automatic sequential regulating device embodying my invention includes a casing 20 which houses a driving motor preferably in the form of a clock motor of either an electrical or mechanical type. Preferably the driving motor is a self-starting synchronous electric clock motor such as is commonly in use today in electric clocks of various types. Preferably the drive motor drives through an escapement mechanism housed in the housing 22 at the right of the housing 20 to a drive pinion 24 which projects from the right of the housing 22. The drive motor and the escapement mechanism may be the type illustrated in the Hall Patent No. 2,227,133 issued December 31, 1940. This mechanism causes the intermittent driving of the drive pinion 24 which is continuously in driving engagement with the main gear 26. Although this arrangement is preferred and appears to be more practical, the invention may also be used where the drive motor within the housing 20, through reduction gears within the housing 22 drives the pinion 24 and the gear 26 at a very slow but uniform rate.

The main gear 26 is fixed upon the rear end of the main cam shaft 28 which also has fixed thereon the peripheral cams 30, 32 and 34. The main cam shaft 28 has flats on opposite sides, as illustrated in Figs. 2 to 4, and spacing collars are provided between each of the peripheral cams as well as between the peripheral cam 30 and the main gear 26 to hold the peripheral cams 30, 32 and 34 firmly in place and prevent their relative rotation. At the side of the cam 34 is a cylindrical cam 36 fixed thereon provided with a spring-pressed follower 38 as shown in Fig. 7. The follower 38 engages the cam 36 to yieldingly hold the cam shaft 28 in either of two axial positions. Fig. 7 shows the cam 36 in a different position of rotation from that shown in Fig. 1. The cam shaft 28 rides in a front bearing 40 and is provided with a collar 42 which limits its inward movement. At the extreme end of the main cam shaft 28 is the dial knob 44 which is preferably provided with suitable legends for indicating the sequential arrangement and duration of the various operations controlled by the regulating device.

The peripheral cams 30, 32 and 34 may be used to operate any sort of control device, such as valves, but for the purpose of illustration I have shown each provided with a cam follower, such as the cam follower 46 yieldingly mounted upon the end of a leaf spring 48 tensioned so as to normally urge the cam follower into engagement with the periphery of the peripheral cam 30. The cam follower 46 is also connected through the leaf spring 50 (see Fig. 3) with a movable double contact 52 of a double throw switch mechanism which includes an upper contact 54 and a lower contact 56. At the side of the main gear 26 is a sector gear 58 (see Figs. 11 and 2) fixed to one end of a sleeve 60 which is rotatably mounted upon one of the cam shaft spacers between the main gear 26 and the peripheral cam 30.

Fixed to the other end of the sleeve 60 is a sector cam 62 which is at the side of the peripheral cam 30. It includes a cutout portion of nearly 180 degrees extending between the shoulders 66 and 82 into which projects a stop pin 64 from the adjacent side of the peripheral cam 30. This stop pin 64 limits the relative rotation between the sector gear cam unit which includes the sector gear 58, the sleeve 60 and the sector cam 62 to a relative rotation of less than 180 degrees. The cutout portion of the sector cam 62 may be increased, but of course, should not be as much as 360 degrees. One shoulder 66 of the cutout portion of the sector gear 62 is normally held against the stop pin 64 (see Figs. 2 and 4) by a torsion spring 68 having one end hooked around the sector gear 58 and extending therefrom in a counterclockwise direction several times around the sleeve 60 and having its other end 70 hooked through an aperture in the peripheral cam 30.

The sector gear 58 has teeth of the same pitch diameter, circular pitch and depth as the main gear 26 so that it meshes properly with the drive pinion 24 as shown in Figs. 1, 2 and 3 and Figs. 12 to 15. The toothed portion of the sector gear should be longer than the angle of rotation required to extend from the initial starting point to the preselective variable period. In this particular application, at the starting point of the cycle the sector gear 58 is restrained from counterclockwise rotation as viewed in Figs. 2 to 4 by an arm 72 (see Figs. 5 and 6) pivotally mounted upon the pin 74 provided with a torsion spring 76, which normally urges it so that its extreme projection 78 is in a position to engage the teeth of the sector gear 68 as shown in Figs. 6 and 13. The cover 80 for the drive pinion 24 serves as a limiting stop for the arm 72. The spring 76 is sufficiently strong so that its holding power upon the sector gear 58 is greater than the force of the torsion spring 68. It will, however, permit forcible rotation of the sector gear 58 when the stop pin 64 engages the shoulder 82 at the opposite end of the cutout portion of the sector cam 62.

Preceding the starting period, the peripheral cam 30 is provided with an "off" lobe 84 of an intermediate height which holds the movable contact 52 at an intermediate point between the contacts 54 and 56 so that no current can flow.

The cylindrical cam 36 (see Fig. 7) has a front groove 86 which is engaged and yieldingly held by the spring-pressed follower 68 when the cam shaft 28 is pushed inwardly by pushing upon the knob 44. The cylindrical cam 36 has a second groove 88 which, in cooperation with the spring follower 38, yieldingly holds the cam shaft 28 in its outermost position. (See Figs. 6 and 13.) The cam shaft 28 is thus normally yieldingly held in either the "in" or the "out" position which can be changed by pushing in or pulling out the dial knob 44. When the peripheral cam 30 is rotated so that the lobe 84 engages the cam follower 46 the spring follower 38 enters a transfer portion 90 (see Fig. 7) extending from the cylindrical cam groove 86 into the cylindrical cam groove 88 at a suitable camming angle so that the cam shaft 28 is cammed axially from its inner position where the spring follower 38 is in engagement with the groove 86, to its outer position wherein the spring follower 38 is in engagement with the groove 88. This disengages the sector gear 58 by moving it axially out of the plane of the drive pinion 24 into the plane of the end portion 78 of the spring-pressed stop member 72. When in this position any counterclockwise rotation of the cam shaft 28 will carry the sector gear 58 into engagement with the projection 78. (See Figs. 6 and 13.)

To stop the operation of the timing motor 20, there is provided an additional switch mechanism including a fixed switch contact member 92 and a spring mounted contact member 94 having a projection extending therefrom beyond the contact 92 so that when the cam shaft 28 is pulled out the cam 32 will engage the pin to separate the movable contact 94 from the stationary contact 92. These contacts are arranged in series with the timing motor and will be subsequently explained in connection with the wiring diagram Fig. 8.

To start the cycle of the regulating device, the knob 44 (if not in the "out" position) is pulled out and then rotated to the starting position. This just moves the sector gear 58 into engagement with the stop 78 (see Figs. 6 and 13), but the knob is not turned sufficiently far to move the shoulder 66 away from the pin 64. The cam follower 46 is moved to the highest lobe 96 of the peripheral cam 30. The knob is pushed in at this point to provide the maximum intermediate period and the clock motor 20 begins to operate. The lobe 96 holds the follower 46 in its uppermost position with the contact 52 in engagement with the contact 54. The clock motor 20, through the pinion 24, drives both the main gear 26 and the sector gear 58 intermittently a uniform amount at timed intervals until the lobe 96 passes beyond the follower 46. The follower 46 then engages the recess 98 which carries the movable contact 52 downwardly into engagement with the stationary contact 56. Under these circumstances the sector cam 62 remains with its shoulder 66 in engagement with the pin 64 throughout the complete rotation of the cam shaft 28. The sector cam 62 has a lobe 121 of the same length but slightly lower than the lobe 96, as shown in Fig. 2. The remainder of the sector cam 62 has a periphery which is of less diameter than any portion of the peripheral cam 30.

When it is desired to reduce the intermediate period at the start of the cycle of the regulating device, the dial knob 44 is pulled out and rotated in a counterclockwise direction as viewed in Fig. 2 through an angle equal to the time required for the driving pinion 24 to turn the main gear 26 through such an angle equivalent to the amount of the reduction desired and then the knob 44 is pushed in. During this rotation, the sector gear 58 and the sector cam 62 are held stationary by the engagement with the end 78 of the arm 72 as shown in Figs. 3 and 6, while the peripheral cam 30 is advanced in a counterclockwise direction through an equal angle carrying the lobe 96 an equal angle in the counterclockwise direction ahead of the lobe 121 of the sector gear to provide the amount of reduction desired. The pin 64 likewise is moved an equal angle away from the shoulder 66 of the sector gear 62. This reduces the effective or exposed length of the variable cam portion 98 as will be apparent by comparing its effective length in Figs. 2 and 3.

When the dial knob 44 is shoved in, the sector gear 58 engages the pinion 24 before it is fully clear of the end 78 of the stop projection 72. However, when the cam shaft is fully in its rearmost position, the sector gear 58 is fully in mesh with the drive pinion 24 as is the main gear 26. (See Figs. 5, 12, 14.) The pushing in of the dial knob 44 starts the timing motor 20 and the drive pinion 24 holds the main gear 26 and the sector gear 58 in the new relative positions by being in mesh with both gears 26 and 58. The drive pinion 24 drives both the main gear 26 and the sector gear 58 in uniform increments at a uniform rate until the follower 46 reaches the end of the lobe 121 upon the sector cam 62 so that it drops into the recess 98 of the peripheral cam 30. The relationship between the sector cam 58 and the peripheral cam 30 is retained until the end of the toothed portion of the sector gear 58 passes beyond the drive pinion 24. Immediately after the sector gear 58 is free of the drive pinion 24 the torsion spring 68 will advance it in a counterclockwise direction to its original position in which the shoulder 66 is lodged against the stop pin 64 upon the peripheral cam 30.

It will be seen from a comparison of Figs. 3 and 4 with Fig. 2 that less than half of the recess 98 remains to be traversed by the cam follower 46. The time during which the movable contact 52 is in engagement with the stationary contact 56 has been reduced from an amount equivalent to the visible portion of the recess 98 as illustrated in Fig. 2 to an amount equivalent to the portion of the recess 98 between the lobe 121 of the sector cam 62 in Fig. 3, and the succeeding lobe 123 upon the peripheral cam 30 in Fig. 3. The peripheral cam 30 then moves the remaining lobes 123 and 125, as well as the intervening recess 127 and 129, beneath the follower 46 in the usual manner.

Referring now to the wiring diagram of Fig. 8 to illustrate a specific application of the device to a suitable machine, such as an automatic washing machine, there is shown the supply conductors 131 and 133. The supply conductor 131 has a branch 135 connecting to the stationary contact 137. This contact 137 is the lower stationary contact which is engaged by the movable contact 139 operated by the peripheral cam 34 shown in Fig. 1. The second branch 141 connects to the switch 143 which is controlled by the lid of the washing machine. It is connected to the stationary contact 145 which is the upper stationary contact cooperating with the movable contact 139. The movable contact 139 is connected to the switch contact mechanism 92, 94 which is operated by the side of the peripheral cam 32 to open position upon outward movement of the cam shaft 28.

As shown in Fig. 1, an additional operating mechanism in the form of a bent slide member 147 is provided having a projecting upper end 149 capable of engaging the main gear 26 to move the cam shaft 28 outwardly to separate the contacts 92 and 94. This slide member 147 has its end portion 151 located so that a predetermined eccentric movement of the contrifugal basket will cause it to be engaged by a portion of the basket and to be moved a sufficient distance to push the cam shaft 28 outwardly to separate the contacts 92 and 94 to stop the washing machine. This prevents the machine from being damaged when the load is excessively unbalanced.

The contacts 92, 94 are connected by a conductor 153 to the movable contact 155 which is operated by the peripheral cam 32. It cooperates with the upper stationary contact 157 which is connected to the shift solenoid 159 in turn connected to the supply conductor 133. This is energized during the spin periods. The movable contact 155 also cooperates with the lower stationary contact 161 which is connected by the conductor 163 with the mix water solenoid 165 in turn connected to the supply conductor 133. This mix water solenoid is normally energized during the fills prior to each of the rinsing periods.

The conductor 133 also has a branch connection 167 with one contact 169 of a manually operable double throw selector switch 171 having its movable contact connected by the conductor 173 to the stationary contact 54. As shown in Fig. 8 the movable contact of the double throw selector switch is shown in contact with the stationary contact 175 connecting to one end of the hot water solenoid 177, the other end of which is connected with the supply conductor 133. The stationary contact 56 is connected by the conductor 179 to the driving motor 181 of the washing machine, which in turn is connected with the supply conductor 133. The conductor 153, as shown in the diagram connects to the movable contact 52 and also to the timer motor 20 which in turn connects to the supply conductor 133.

In Fig. 9 the dial knob 44 is shown inside of a diagram showing the closed and open positions of the various contacts operated by the three peripheral cams 30, 32 and 34. In this diagram the dial knob 44 and the diagram itself are oriented with respect to a pointer 183 shown in Fig. 9, as pointing to a 14 minute wash period. The period during which the stationary contact is not engaged by the movable contact is in each case shown by separate lines, while the period during which the movable contact contacts the stationary contact is shown by a single heavy line. The contact 137 is shown in the outermost circle and in the succeeding smaller circles are represented closed and open positions of the contacts 145, 161, 157, 54 and 56. The peripheral cams 34, 32 and 30 have lobes and recesses arranged in the same relative angular positions to operate the contacts as illustrated on the diagram. The contact arrangement is shown for the full 14 minute wash period. It should be noted that the fill period is shown as being approximately corresponding to the dial knob indication of a 14 and 11½ minute wash period. When a 14 minute wash period is desired the fill period takes place while the dial is being moved by the timer from the 14 minute position to the 11½ position. At the 11½ minute position the contact 52 disengages itself from the contact 54 and makes contact with the contact 56. The contact 56 is maintained closed for 2½ minutes beyond the zero position thus providing a full 14 minute wash period in addition to the 2½ minute fill period. It should be noted also that the contact 137 is engaged by the movable contact 139 throughout this period.

If it is desired to have a wash period of less than 14 minutes, such as for example, 6 or 8 minutes the dial knob 44 is pulled out at or before the 14 minute position and turned to either the 6 or 8 minute position. Considering the arrangement in a diagrammatic way, the fill period with the closed contact 54 remains in the position shown while the dial knob 44 and the remaining portion of the diagram is bodily rotated with the dial knob 44 until the legend "8," for example, is opposite the pointer 183 with this one exception, that the starting point of the closed variable wash period contact portion of the contact 56 does not begin until the end of the fill period. It will be seen that this will provide the regular 2½ minute fill period followed by a full 8 minute wash period. This is made possible by the fact that under these circumstances when the dial is pulled out and gradually turned so that the "8" upon the variable wash period comes opposite the pointer 183, the sector gear 58 is disengaged from the drive pinion 24 and is held from rotation by the end 78 of the arm 72 while the dial knob 44 and the cam shaft 28, with the main gear 26, the drive pinion 24 and the peripheral cams 30, 32 and 34 are being turned corresponding to the rotation of the dial knob 44 and then are being located in this relationship by the pushing in of the dial knob 44 which engages the sector gear 58 with the drive pinion 24. As described in connection with the mechanism, when the lobe 121 is driven beyond the follower 46 and the sector gear 58 is driven by the drive pinion 24 beyond it (see Fig. 4), the sector cam 62 is returned to its original position against the stop, thereby allowing the remainder of the cycle to proceed in the usual manner. This also places it in the proper position for further use of the regulator.

It will thus be seen that when this regulating device is applied to an automatic washing machine it always insures a uniform 2½ minute fill period and it insures normal operation after the variable wash period regardless of the length of the variable wash period. The variable wash period can be made of any desired length of time, which selection can be made prior to the fill period. Obviously the single lobe cam 121 could be replaced by a number of lobes and recesses as shown in Fig. 10, to provide a plurality of operations prior to the variable period should the application so require.

The peripheral cam 30 is referred to in some claims as the first operating device and in some claims as the first cam means and in some claims as an operating means. The sector cam 62 is referred to in some claims as the second operating device and in some of the claims as the second cam means and in some claims as the second operating means.

While the form of embodiment of the invention as herein disclosed, constitutes a preferred form, it is to be understood that other forms might be adopted, as may come within the scope of the claims which follow.

What is claimed is as follows:

1. A regulating device including a drive pinion, a driven gear meshing with and driven by said drive pinion, a sector gear coaxially mounted relative to said driven gear, said sector gear having gear teeth of substantially the same pitch circle, depth and thickness as the gear teeth of the driven gear, a first operating device, said driven gear having a controlling arrangement with the first operating device, a second operating device, said sector gear having a controlling arrangement with the second operating device, and means for moving said sector gear into and out of engagement with said drive pinion.

2. A regulating device including a drive pinion, a rotatable shaft means provided with a driven gear meshing with and driven by said drive pinion, a first cam means mounted upon said shaft means, a second gear and a second cam means connected together and being rotatably mounted upon said shaft means, cam follower means for said first and second cam means, and means for moving said second gear into and out of mesh with said drive pinion.

3. A regulating device including a drive pinion, a rotatable shaft means provided with a driven gear meshing with and driven by said drive pinion, a first cam means mounted upon said shaft means, a second gear and a second cam means connected together and being rotatably mounted upon said shaft means, cam follower means for said first and second cam means, and means for moving said second gear into and out of mesh with said drive pinion and for rotating said second gear and the second cam means relative to the driven gear and the first cam means.

4. A regulating device including a drive pinion, a rotatable shaft means provided with a driven gear meshing with and driven by said drive pinion, a first cam means mounted upon said shaft means, a second gear and a second cam means connected together and being rotatably mounted upon said shaft means, cam follower means for said first and second cam means, and means for moving said rotatable shaft axially relative to said drive pinion to move said second gear into and out of mesh with said drive pinion.

5. A regulatng device including a drive pinion, a rotatable shaft means having a driven gear meshing with said drive pinion, a first cam means mounted upon said rotatable shaft means, a sector gear having teeth adapted to mesh with said drive pinion, a second cam means rotatably mounted upon said shaft means and connected to said sector gear, cam follower means for said first and second cam means, means for moving said sector gear axially relative to the drive pinion to place them into or out of mesh, and holding means effective when said sector gear is out of mesh with said drive pinion for holding the toothed portion of the sector gear in axial alignment with said drive pinion.

6. A regulating device including a drive pinion, a rotatable shaft means having a driven gear meshing with said drive pinion, an operating means operated by said shaft means, a sector gear having teeth adapted to mesh with said drive pinion, a second operating means connected to and operated by said sector gear, said sector gear being rotatably mounted on said shaft means coaxially with said driven gear, a stop means providing cooperation between the sector gear and the driven gear to limit their relative rotation, a spring means for causing relative rotation of the sector gear and the driven gear until it is limited by the stop means, and means for moving said sector gear into and out of peripheral alignment with said drive pinion to mesh and disengage the sector gear and the drive pinion.

7. A regulating device including a drive pinion, a rotatable shaft means having a driven gear meshing with said drive pinion, an operating means operated by said shaft means, a sector gear having teeth adapted to mesh with said drive pinion, a second operating means connected to and operated by said sector gear, said sector gear being rotatably mounted on said shaft means coaxially with said driven gear, a stop means providing cooperation between the sector gear and the driven gear to limit their relative rotation, a spring means for causing relative rotation of the sector gear and the driven gear until it is limited by the stop means, and means for moving said sector gear into and out of peripheral alignment with said drive pinion to mesh and disengage the sector gear and the drive pinion, and a second stop means effective to stop said sector gear in the disengaged position.

8. A regulating device including a drive means, a first driven means driven by said drive means, a first operating means operated by said first driven means, an interrupted driven means adapted to be driven by said drive means, a second operating means operated by said interrupted driven means, means for changing the relationship between the interrupted driven means and the first driven means, and means for moving said interrupted driven means into and out of driving relationship with said drive means to lock or to unlock the relationship between the first driven means and the interrupted driven means.

9. A regulating device including a drive pinion, a rotatable shaft means having a driven gear meshing with said drive pinion, an operating means driven by said shaft means, a sector gear rotatably and coaxially mounted relative to said driven gear, said sector gear having teeth adapted to mesh with said drive pinion, a releasable stopping arrangement cooperating with said sector gear when said sector gear is out of mesh with said drive pinion to hold the sector gear while the driven gear is free to rotate to another position, and means for releasing said sector gear from the holding action of said stopping arrangement and placing said sector gear in mesh with said drive pinion.

10. A regulating device including a drive pinion, a rotatable shaft means having a driven gear meshing with said drive pinion, an operating means driven by said shaft means, a sector gear rotatably and coaxially mounted relative to said driven gear, said sector gear having teeth adapted to mesh with said drive pinion, a releasable stopping arrangement cooperating with said sector gear when said sector gear is out of mesh with said drive pinion to hold the sector gear while the driven gear is free to rotate, and manipulating means for rotating said rotatable shaft means and said driven gear and said operating means to another position while said sector gear is being held by said stopping arrangement and for releasing said sector gear from the holding action of said stopping arrangement when said shaft means is in said another position.

11. A regulating device including a drive means, a first driven means driven by said drive means, a first operating means operated by said first driven means, an interrupted driven means adapted to be driven by said drive means, a second operating means operated by said interrupted driven means, a releasable stopping arrangement cooperating with said interrupted driven means when said interrupted driven means is out of driving engagement with the drive means to hold the interrupted driven means while the first driven means is free to rotate, and manipulating means for rotating said first driven means relative to said interrupted driven means to a second position while said interrupted driven means is being held by said stopping arrangement and for releasing said interrupted driven means from the holding action of said stopping arrangement when said first driven means is in the second position.

12. A regulating device including a drive means, a first driven means driven by said drive means, a first operating means operated by said first driven means, an interrupted drive means adapted to be driven by said drive means, a second operating means operated by said interrupted driven means, a stop means, said interrupted driven means having one alternate location out of engagement with said stop means for driving engagement with said drive means and a second alternate location out of driving engagement with said drive means for engagement with said stop means, manipulating means for moving said interrupted driven means into and out of engagement with said stop means and for rotating said first driven means relative to said interrupted driven means when said interrupted driven means is in engagement with said stop means.

13. A regulating device including a drive pinion, a rotatable shaft means having a driven gear meshing with said drive pinion, an operating means operated by said shaft means, a sector gear having teeth adapted to mesh with said drive pinion, a second operating means connected to and operated by said sector gear, said sector gear being rotatably mounted on said shaft means coaxially with said driven gear, a stop means, said shaft means and said sector gear having one alternate location out of engagement with said stop means for meshing engagement with said drive pinion and a second alternate location in engagement with said stop means out of meshing engagement with said drive pinion, and means for moving said shaft means and said sector gear from one location to the second location including manipulating means for rotating said shaft means and said drive pinion relative to said sector gear when said shaft means and said sector gear are in the second position.

KENNETH O. SISSON.

REFERENCES CITED

The following references are of record in the file of this patent:

UNITED STATES PATENTS

| Number | Name | Date |
|---|---|---|
| 823,970 | Pupke | June 19, 1906 |
| 2,325,837 | Dyer | Aug. 3, 1943 |
| 2,374,590 | Dunham | Apr. 24, 1945 |
| 2,376,901 | Clark | May 29, 1945 |